US011118938B2

(12) United States Patent
Schmidt et al.

(10) Patent No.: US 11,118,938 B2
(45) Date of Patent: *Sep. 14, 2021

(54) METHOD FOR COLLECTING DATA, SENSOR, DATA COLLECTOR, AND SUPPLY NETWORK

(71) Applicants: DIEHL METERING SYSTEMS GMBH, Nuremberg (DE); DIEHL METERING S.A.S, Saint Louis (FR)

(72) Inventors: Achim Schmidt, Weissenohe (DE); Thomas Kauppert, Nuremberg (DE); Petra Joppich-Dohlus, Rathsberg (DE); Stefan Schmitz, Nuremberg (DE); Christoph Sosna, Nuremberg (DE); Klaus Gottschalk, Winkelhaid (DE); Guy Bach, Waldighoffen (FR); Aster Breton, Mullhouse (FR)

(73) Assignees: Diehl Metering Systems GmbH, Nuremberg (DE); Diehl Metering S.A.S., Saint Louis (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,067

(22) Filed: Dec. 16, 2019

(65) Prior Publication Data

US 2020/0191609 A1 Jun. 18, 2020

(30) Foreign Application Priority Data

Dec. 14, 2018 (DE) .............................. 102018009818

(51) Int. Cl.
*G01D 4/00* (2006.01)
*G01F 9/00* (2006.01)
(Continued)

(52) U.S. Cl.
CPC ............. *G01D 4/004* (2013.01); *G01D 4/006* (2013.01); *G01F 9/001* (2013.01);
(Continued)

(58) Field of Classification Search
CPC .......... G01D 4/00; G01D 4/002; G01D 4/004; G01D 4/006; G01F 9/001; G01F 23/0061;
(Continued)

(56) References Cited

U.S. PATENT DOCUMENTS 8,560,256 B2* 10/2013 Gu ....................... G01R 15/207
702/62
9,270,554 B2* 2/2016 Ito ......................... H04J 3/0667
(Continued)

*Primary Examiner* — Franklin D Balseca
(74) *Attorney, Agent, or Firm* — Laurence A. Greenberg; Werner H. Sterner; Ralph E. Locher

(57) ABSTRACT

A method for collecting data, preferably in connection with a consumption, a physical or physico-chemical parameter and/or an operating state in a supply network for consumables. A measuring element of a local sensor provides elementary measuring units, which correspond to at least one physical or physico-chemical variable or parameter, as raw measurement data. In order to determine the measurement resolution of the sensor, the conditions for generating time stamps are determined in advance using a correlation model, time stamps of successive raw measurement data are generated in the sensor on the basis of the correlation model, the time stamps are transmitted and the raw measurement data acquired by the measuring element are reconstructed and evaluated on the basis of the time stamps using the correlation model. The temporal offset between a sensor and a receiver is corrected by transmitting telegrams to compensate for the temporal offset.

37 Claims, 10 Drawing Sheets

(51) Int. Cl.
*G01F 23/00* (2006.01)
*H04L 29/08* (2006.01)
*G06Q 50/06* (2012.01)

(52) U.S. Cl.
CPC .......... *G01F 23/0061* (2013.01); *H04L 67/12* (2013.01); *G06Q 50/06* (2013.01)

(58) Field of Classification Search
CPC .......... H04L 67/12; G06Q 50/06; H04Q 9/00; H04Q 2209/00; H04Q 2209/10; H04Q 2209/40; H04Q 2209/60; H04Q 2209/70; H04Q 2209/80; H04Q 2209/82; H04Q 2209/826
See application file for complete search history.

(56) References Cited

U.S. PATENT DOCUMENTS

| | | | |
|---|---|---|---|
| 10,089,362 B2* | 10/2018 | Cammert | G06F 16/24568 |
| 10,302,454 B2* | 5/2019 | Mackie | G01F 1/56 |
| 10,573,104 B2* | 2/2020 | Jain | G07C 9/28 |
| 2007/0124253 A1* | 5/2007 | Angerame | G06Q 50/06 |
| | | | 705/63 |
| 2011/0004445 A1 | 1/2011 | Borlee | |
| 2013/0127637 A1* | 5/2013 | Seroussi | H04W 52/0251 |
| | | | 340/870.39 |
| 2019/0044786 A1* | 2/2019 | Wouhaybi | H04L 29/08468 |
| 2020/0128309 A1* | 4/2020 | Bach | H04Q 9/00 |
| 2020/0191607 A1* | 6/2020 | Sosna | G01F 9/001 |
| 2020/0191608 A1* | 6/2020 | Joppich-Dohlus | G01F 9/001 |
| 2020/0196031 A1* | 6/2020 | Joppich-Dohlus | G01D 4/002 |
| 2020/0196032 A1* | 6/2020 | Schmitz | H04Q 9/00 |
| 2020/0196033 A1* | 6/2020 | Schmitz | G01D 4/002 |

\* cited by examiner

METHOD FOR COLLECTING DATA, SENSOR, DATA COLLECTOR, AND SUPPLY NETWORK

CROSS-REFERENCE TO RELATED APPLICATION

This application claims the priority, under 35 U.S.C. § 119, of German patent application DE 10 2018 009 818, filed Dec. 14, 2018; the prior application is herewith incorporated by reference in its entirety.

BACKGROUND OF THE INVENTION

Field of the Invention

The present invention relates to a method for collecting data, preferably data in connection with a consumption, a physical or physico-chemical parameter and/or an operating state, during operation of a local sensor, such as a sensor for a consumption meter, as part of a supply network which comprises at least one local sensor or a plurality of local sensors, and is intended to distribute a consumable. The sensor contains a measuring element. The measuring element of the respective sensor provides elementary measuring units, which correspond to at least one physical or physico-chemical variable or at least one physical or physico-chemical parameter, as raw measurement data. The sensor comprises radio communication means and storage means.

The invention also relates to a sensor, to a data collector and to a supply network for distributing a consumption medium. The supply network has at least one local sensor, preferably a plurality of local sensors, for generating and/or forwarding time stamps of raw measurement data on the basis of the correlation model, preferably raw measurement data in connection with a consumption of consumption medium, a physical or physico-chemical parameter and/or an operating state of a consumption meter, a data collector, a primary communication path between the respective sensor and the data collector, a head end for evaluating the data, and a tertiary communication path between the data collector and the head end.

Consumption meters are part of supply networks for distributing consumables, for example gas, water, heat or electricity, and are used to generate consumption data. Consumption data are calculated by a microprocessor in the meter on the basis of raw measurement data provided by a measuring element of a sensor and are forwarded to a central data management means (head-end system) via a communication system in the form of a bus system, in particular a so-called M-bus system. The data are, in particular, the current consumption, that is to say the meter reading.

In this case, raw measurement data are generated by the measuring element of a sensor in the consumption meter at predetermined predefined times, are evaluated by a microprocessor in the consumption meter, that is to say are converted into consumption data, and the resulting consumption data are then retrieved from the individual locally arranged consumption meters by a reading or receiving device (M-bus master or concentrator or data collector) via a primary communication path at defined times. The consumption data are then transmitted on to a head-end system by the reading or receiving device via a tertiary communication path, for example based on LAN, GPRS, 3G, LTE. The consumption data can then be displayed in the head end or used for invoicing. The previous concept of consumption data acquisition is limited in terms of both its depth of information and its amount of information.

BRIEF SUMMARY OF THE INVENTION

It is accordingly an object of the invention to provide a method and a sensor for collecting data, a data collector and a supply network, which overcome a variety of disadvantages of the heretofore-known devices and methods of this general type and which provides for a method of the generic type for collecting and/or forwarding data and a sensor to be used for this purpose, each with an increased information content.

With the foregoing and other objects in view there is provided, in accordance with the invention, a method for collecting data during operation of a local sensor in a supply network for distributing a consumable, the method comprising:

providing the sensor with a measuring element, with radio communication capability and a memory;

providing elementary measuring units with the measuring element of the sensor, the elementary measuring units corresponding to at least one physical or physico-chemical variable or at least one physical or physico-chemical parameter and forming raw measurement data;

determining conditions for generating time stamps in advance using a correlation model in order to determine a measurement resolution of the sensor;

generating time stamps of successive raw measurement data in the sensor on a basis of the correlation model;

transmitting the time stamps via a wired connection and/or wirelessly, with a result that the raw measurement data acquired by the measuring element are reconstructed and evaluated on a basis of the time stamps using the correlation model; and correcting a temporal offset between a sensor and a receiver by transmitting telegrams to compensate for the temporal offset.

In a preferred embodiment, the method is configured to collect data in connection with a consumption, a physical or physico-chemical parameter and/or an operating state, during operation of a plurality of local sensors for consumption meters as part of a supply network which includes a plurality of local sensors.

There is also provided, in accordance with the invention, a sensor for operation in accordance with the method, and a data collector configured for operation in accordance with the method.

With the above and other objects in view there is also provided, in accordance with the invention, a supply network for distributing a consumption medium, the supply network comprising:

at least one local sensor for generating and/or forwarding time stamps of raw measurement data based on a correlation model, said at least one local sensor being configured to be operated in accordance with the method as outlined above;

a data collector;

a primary communication path between said sensor and said data collector;

a head end for evaluating the measurement data; and a tertiary communication path between said data collector and said head end.

In other words, the invention provides for a method for collecting data, preferably data in connection with a consumption, a physical or physico-chemical parameter and/or an operating state, during operation of a local sensor, preferably a sensor for a consumption meter, as part of a supply network which comprises at least one local sensor, preferably a plurality of local sensors, and is intended to distribute a consumable, wherein the sensor contains a measuring element, the measuring element of the respective sensor provides elementary measuring units, which correspond to at least one physical or physico-chemical variable or at least one physical or physico-chemical parameter, as raw measurement data, and the sensor comprises radio communication means and storage means, characterized in that, in order to determine the measurement resolution of the sensor, the conditions for generating time stamps are determined in advance using a correlation model, time stamps of successive raw measurement data are generated in the sensor on the basis of the correlation model, the time stamps are transmitted via a wired connection and/or via a radio path, with the result that the raw measurement data acquired by the measuring element are reconstructed and evaluated on the basis of the time stamps using the correlation model, wherein the temporal offset between a sensor and a receiver is corrected by transmitting telegrams to compensate for the temporal offset.

According to the invention, in order to determine the measurement resolution of the sensor, the conditions for generating time stamps are determined in advance using a correlation model. Time stamps of successive raw measurement data are generated in the sensor on the basis of the correlation model and are stored in the storage means. Only the time stamps assigned to the acquired raw measurement data are then transmitted via the primary communication path, with the result that the raw measurement data acquired by the measuring element can be reconstructed again after transmission and can be evaluated on the basis of the time stamps arriving at the master using the correlation model. This dispenses with computationally complex and therefore energy-intensive computing operations in the region of the local sensor. Computationally complex and energy-intensive computing operations can therefore be moved to the region of the master or a head end. The method according to the invention makes it possible to provide time stamps of raw measurement data in a continuous, complete and consistent temporal relationship, that is to say without a gap, in particular in the region of a remote central processing system or a head-end system. The raw measurement data reconstructed from the time stamps can be continuously assigned to the temporal profile, that is to say represent a real-time profile which excludes discontinuous gaps or times in which data are missing. The continuous raw measurement data stream generated in the head end in accordance with the method according to the invention has a much higher resolution over the continuous time axis than previous solutions. In addition to a consumption calculation, for example, the invention makes it possible to carry out a much greater number of calculations and/or determinations and/or functions, including "business" functions, for example in the head-end system, than was previously possible. On account of the method according to the invention, the structure of the sensor can also be considerably simpler and more cost-effective since complex microprocessors for calculations, for example for calculating the flow rate, are dispensed with. On account of the captured temporal relationship of the raw measurement data, manipulations can be avoided since the measurement results can be compared, over their entire temporal profile, with empirical values over the entire time axis. Furthermore, the energy consumption of the subassembly comprising the sensor and the time stamp preparation means and/or the communication means is considerably lower than in previous embodiments which locally evaluate the data owing to the fact that energy-intensive computing power is dispensed with. The time stamps may be times or time differences. The times or time differences may be actual time data or real-time data or may be at least oriented thereto. The time differences may be formed from time stamp to time stamp and/or from a permanently predefined time.

The temporal offset can be advantageously corrected by transmitting telegrams for compensating for the temporal offset between a sensor or consumption meter and a receiver. The receiver may be expediently a data collector or optionally a head-end system. The consumption meter and the receiver may have different timers, with the result that they have a different time base. The temporal offset of these time bases is compensated for by transmitting telegrams. The time offset may be the instantaneous temporal difference between the timer in the sensor or the consumption meter and the receiver, for example a data collector and/or a head end. The temporal drift may describe the temporal change in the time offset provided that the time offset is not constant over time. Since the usability of the time stamps is dependent on the respective time base, the compensation for the temporal offset between the sensor or consumption meter and the receiver is very important. A higher granularity of the reconstructed raw measurement data allows more extensive possible applications or uses, for example anticipatory maintenance and/or network management. A method for compensating for the temporal offset is essential, in particular, in a unidirectional sensor network having a plurality of independent timers and therefore time bases. Since a downlink from the receiver to the sensor or consumption meter is not provided in a unidirectional sensor network, the timer in the sensor or in the consumption meter cannot be adapted to a standard time.

The local sensor(s) can be expediently connected to a data collector via a primary communication path, a tertiary communication path can be provided between the data collector and a head end, and the time stamps transmitted by sensors and/or by consumption meters can be collected, stored and/or evaluated in the data collector and/or in the head end. Transmitting the time stamps via the primary and tertiary communication paths makes it possible to carry out a considerably greater number of calculations and/or determinations and/or functions, including "business" functions, than before in the head end, where sufficient computing power is available.

A particular value or a particular value change or a particular value difference of the at least one physical or physico-chemical variable or the at least one physical or physico-chemical parameter can be determined in the correlation model for the assignment of a time stamp, wherein, if the particular value or the particular value difference or the particular value change is captured by the measuring element, the time stamp is triggered, is stored as such in the storage means of the sensor and is provided for transmission. If the value captured by the sensor does not change, but time stamp is not generated. It is therefore typical of the method according to the invention that relatively long periods can elapse without a time stamp. Therefore, data need not be continuously transmitted. Nevertheless, the method has a very high resolution.

In particular, a gradually or incrementally increasing meter reading and/or a value table can be represented by means of time stamps within the scope of the correlation model.

The time stamps are preferably provided with a sign, for example a positive or negative sign. This is advantageous, in particular, when representing a value table since it is thereby stipulated whether the specific time stamp relates to a rising or falling value in the value table.

According to the invention, a plurality of time stamps can each be transmitted as a data packet along the primary communication path.

A raw measurement data stream can be advantageously generated on the basis of the time stamps arriving at the data collector and/or at the head end using the correlation model. The relevant successive time stamps are not, in particular, calculations and/or evaluations.

The telegrams for compensating for the temporal offset can be expediently numbered consecutively. As a result, a telegram for compensating for the temporal offset, which has not been registered in a meter-specific manner at the receiver for example, can be identified in a simple manner. A system-wide key, for example, can be used to consecutively number the telegrams, with the result that each allocated number can be specifically assigned to a sensor or consumption meter. Missing telegrams for compensating for the temporal offset can therefore be taken into account and the chronological sequence can be ensured.

An error value can be advantageously calculated by means of the reception time of the telegrams for compensating for the temporal offset. For example, the reception time of a telegram for compensating for the temporal offset, as expected at the receiver, can differ from the actual reception time. An error value between the timer in the sensor or in the consumption meter and the timer in the receiver can be calculated on the basis of this difference.

The periodicity of the telegrams for compensating for the temporal offset can be expediently known and the error value can be calculated on the basis thereof. If telegrams for compensating for the temporal offset are transmitted regularly with a known periodicity from the sensor or consumption meter to the receiver, a temporal error value or correction value can be calculated, for example, by means of a difference in the periodicity at the receiver.

The data collector and/or the head end can advantageously receive the telegrams for compensating for the temporal offset and can determine a temporal error on the basis of the temporal interval between telegrams for compensating for the temporal offset. On the one hand, the temporal interval between received telegrams for compensating for the temporal offset can be compared with a stipulated value for the temporal interval. As a result, an instantaneous error between the timer in the sensor or in the consumption meter and the timer in the data collector and/or head end can be determined. On the other hand, a change in the error between the stipulated temporal interval between telegrams for compensating for the temporal offset and the determined temporal interval can be determined. Divergence of the timers in the sensor or in the consumption meter and in the data collector and/or head end can therefore be detected and compensated for.

In one configuration of the invention, the data telegrams of the time stamps can be advantageously transmitted by the sensor or by the consumption meter in an asynchronous manner with respect to the telegrams for compensating for the temporal offset. As a result, the compensation for the temporal offset is independent of, and decoupled from, the actual transmission of the data or raw measurement data. It is therefore possible to separate the time compensation with regard to process management from the transmission channel. Since the temporal offset or the temporal drifting normally occurs continuously and usually proceeds relatively slowly, the compensation for the temporal offset can be carried out relatively rarely. In addition, it is therefore possible to use joint time compensation for a plurality of data transmission channels, for example protocol transmission or a physical radio frequency channel.

The temporal transmission interval of the telegrams for compensating for the temporal offset may expediently differ from the temporal transmission interval of the time stamps. The shorter the temporal transmission intervals of the telegrams for compensating for the temporal offset, the more stable and simpler the compensation for the temporal offset between the timer in the sensor or the consumption meter and the timer in the receiver. The time stamps may be transmitted in bundled packets, for example, with the result that their temporal transmission interval is greater than the transmission interval of the telegrams for compensating for the temporal offset.

It is possible for the time stamps to be transmitted from the data collector to the head end together with the telegrams for compensating for the temporal offset. If the telegrams for compensating for the temporal offset have not already been evaluated in the data collector, the telegrams for compensating for the temporal offset can be transmitted to the head end together with the time stamps, for example. The data collector and the head end usually have a timer which is determined by a standard time, such as universal time coordinated (UTC). The location in the sensor network at which the temporal offset of the timers is compensated for is therefore irrelevant for the method.

The data collector and/or the head end can expediently coordinate the telegrams for compensating for the temporal offset from a multiplicity of sensors or consumption meters and can sort them according to the individual temporal error values. In a sensor network, a multiplicity of sensors and/or consumption meters, for example, transmit telegrams for compensating for the temporal offset to the corresponding data collector. The data collector can either itself coordinate the received telegrams for compensating for the temporal offset or can transmit them to the head end for further processing. The coordination may comprise assigning the telegrams for compensating for the temporal offset to the individual sensors or consumption meters. As a result, it is possible, for example, to determine the temporal error values which are individual to each sensor or consumption meter.

One configuration of the invention provides for the time stamps to be transmitted by the sensor or consumption meter together with the telegrams for compensating for the temporal offset. It is also possible to concomitantly transmit the time information from the sensor or the consumption meter in the standard data telegram for the time stamps from the consumption meter to a receiver for the purpose of compensating for the temporal offset. Therefore, there is no need for any dedicated telegrams for compensating for the temporal offset. As a result, it is expediently possible to dispense with separate transmissions of telegrams for compensating for the temporal offset. The time offset and/or the temporal drift between the timer in the sensor or in the consumption meter and the timer in the receiver is calculated solely by means of the data telegrams which contain the time stamps. The time offset can be indicated in the unit $[\Delta t]=s$ and the temporal drift can be indicated in the unit $[\Delta t/t]=1$.

It is particularly advantageous that the temporal error between the sensor or the consumption meter and a standard time is determined on the basis of the difference between the transmission time of a telegram in the sensor or in the consumption meter and the reception time of this telegram in the receiver, in particular in the data collector and/or in the head end. For this purpose, it is possible to assume that the transmission time of the telegram is identical to the reception time of this telegram. It can therefore be assumed that no significant temporal offset occurs between transmission and reception. The telegram can be provided with the transmission time of the sensor or of the consumption meter in the sensor or in the consumption meter, which transmission time is derived from the timer in the sensor or the consumption meter. Upon receiving this telegram, in the receiver, the concomitantly transmitted transmission time of the sensor or of the consumption meter can be compared with the reception time in the receiver. If there is no time offset and/or no temporal drift between the sensor or consumption meter and the receiver, the transmission time transmitted by the sensor or by the consumption meter would correspond to the reception time in the receiver under the assumption described above. If the transmission time and reception time are not identical, a time offset and/or a temporal drift between the timer in the sensor or the consumption meter and the timer in the receiver can be calculated therefrom. For this type of compensation for the temporal offset, it is irrelevant whether the telegrams additionally contain time stamps of the sensor or of the consumption meter in addition to the transmission time.

The reconstructed raw measurement data stream can preferably be evaluated, in the further course of the data processing, at any time on a time-historical basis without a time gap irrespective of its temporal resolution (sampling rate or multiple of the sampling rate). This results in the advantage that, for example, even event-related state changes in the supply network in the past (for example overflow, underflow, leakages, manipulation attempts etc.) can be determined and documented with a precise time allocation and without gaps. There is a high degree of accuracy in the temporal resolution as a result of highly granular time-discrete sampling. It is also possible to display past consumption data to the consumer in a considerably more accurate manner and/or to better incorporate them in evaluations with respect to the consumption behavior or changes in the latter. This in turn has the effect of optimizing consumption and is a particularly important item of information from the network supplier for the consumer.

The relevant successive raw measurement data are not, in particular, calculations and/or evaluations, but rather elementary measuring units.

For example, the elementary measuring units may be the electrical voltage or the current intensity which is measured. For example, the output voltage of a Hall sensor in the event of its excitation or the voltage of a temperature sensor can be captured. The measured physical variable can expediently relate to a supply medium, preferably water, electricity, fuel or gas, of a supply network.

It is possible for the or one of the measured physical or chemico-physical parameters to be characteristic of the quantity, quality and/or composition of a fluid which flows through the relevant sensor or with which contact is made by the latter.

The elementary measuring unit can expediently generate a time stamp as soon as the elementary measuring unit receives a pulse.

It is possible for the raw measurement data stream to have a temporal resolution which is determined or conditioned by the sensor sampling rate or measuring element sampling rate or a multiple thereof. The raw measurement data stream expediently has a temporal resolution which is determined or at least conditioned only by the sensor sampling rate or measuring element sampling rate or a multiple thereof. The temporal resolution of the raw measurement data stream is preferably in the seconds range, the tenths of a second range, the hundredths of a second range or the thousandths of a second range.

The raw measurement data stream is advantageously continuous and/or complete taking the determined resolution as a basis. This results in a very particularly high measured value resolution along the continuous temporal profile and in turn a particular depth of information as a basis for evaluations or calculations based thereon.

In order to generate the continuous raw measurement data stream, the data packets are expediently combined in a corresponding time sequence reference or are at least related to one another, with the result that the time stamps contained in the packets are subsequently combined again along the real-time axis in accordance with their sampling and prior division into packets, or are at least temporally related to one another in a continuous manner.

Settling the question of when a new data transmission should be carried out in the form of a message or a telegram (of one or more data packets) preferably depends on whether at least one of the two conditions has been satisfied, namely:
 expiry of a predefined interval of time; and
 reaching a predefined quantity of time stamps since the previous transmission.

A time sequence reference of the data packets to be transmitted can be easily implemented on the basis of this.

It is particularly expedient that the method comprises packaging the time stamps by formatting them in data packets of a predetermined fixed size, wherein, each time the accumulated data reach the size of a data packet or the predefined interval of time has expired, a new transmission is initiated.

It is possible to carry out the data transmission with redundancy. The redundancy in the transmission can be expediently achieved by repeatedly transmitting the same data packet in a plurality of successive transmission operations or on different communication paths or radio channels. It is also possible for the redundancy in the transmission to be achieved by repeatedly transmitting the same time stamps. For example, the transmission of a data packet or a time stamp can be repeated five times.

The time stamps can be advantageously compressed and the compression of the time stamps can be carried out in a loss-free manner. The compression of the time stamps can be carried out in a loss-free manner in the region of the sensor or the consumption meter. The time stamps can be expediently transmitted in compressed form and/or via a radio path. The transmission can be carried out repeatedly and in a conditional manner in each case after expiry of a predefined interval of time and/or after reaching a predefined quantity of time stamps which have been collected since a previous transmission.

Alternatively, however, the compression of the time stamps can also be carried out with a predefined permissible loss level. If the data compression is carried out with a predefined permissible loss level, the compression ratio can then be increased to the detriment of lower accuracy in the reproduction at the receiver end if the user or operator prefers an energy saving and accepts a certain inaccuracy in the recovery and reproduction of the original measurement data (that is to say accepts a certain loss). The loss ratio or the compression ratio can be provided as a programmable or adjustable parameter which determines or sets the compression mode.

As clear and non-restrictive examples of data compression algorithms, the following can be taken into account within the scope of the method according to the invention:

differential compression (delta encoding) in conjunction with Huffman coding, runlength encoding (RLE) or preferably adaptive binary arithmetic coding (CABAC).

The present invention also claims, in a coordinate claim, a sensor which is set up for local use in a supply network which comprises a plurality of local sensors and is intended to distribute a consumption medium, for example water, gas, electricity, fuel or heat. The sensor can be advantageously operated in accordance with a method according to at least one of Method claims 1 to 32. Such a sensor may be part of a consumption meter. During operation of a supply network, said sensor makes it possible to ensure the consumption and further state properties in a very high resolution along the temporal profile in a gapless and continuous manner.

The present invention furthermore also claims a data collector. The data collector can be advantageously operated in accordance with a method according to at least one of Method claims 1 to 32.

Finally, the present invention also relates to a supply network for distributing a consumption medium, for example gas, water, electricity, fuel or heat, having at least one local sensor, preferably a plurality of local sensors, for generating and/or forwarding time stamps on the basis of raw measurement data on the basis of the correlation model, preferably raw measurement data in connection with a consumption of consumption medium and/or an operating state of a consumption meter, having a data collector, a primary communication path between the respective sensor and the data collector, a head end for evaluating the data and a tertiary communication path between the data collector and the head end. According to the present invention, the supply network is characterized in that the sensor(s) in said network is/are operated in accordance with a method according to at least one of claims 1 to 32.

Other features which are considered as characteristic for the invention are set forth in the appended claims.

Although the invention is illustrated and described herein as embodied in method for collecting data and sensor, data collector and supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
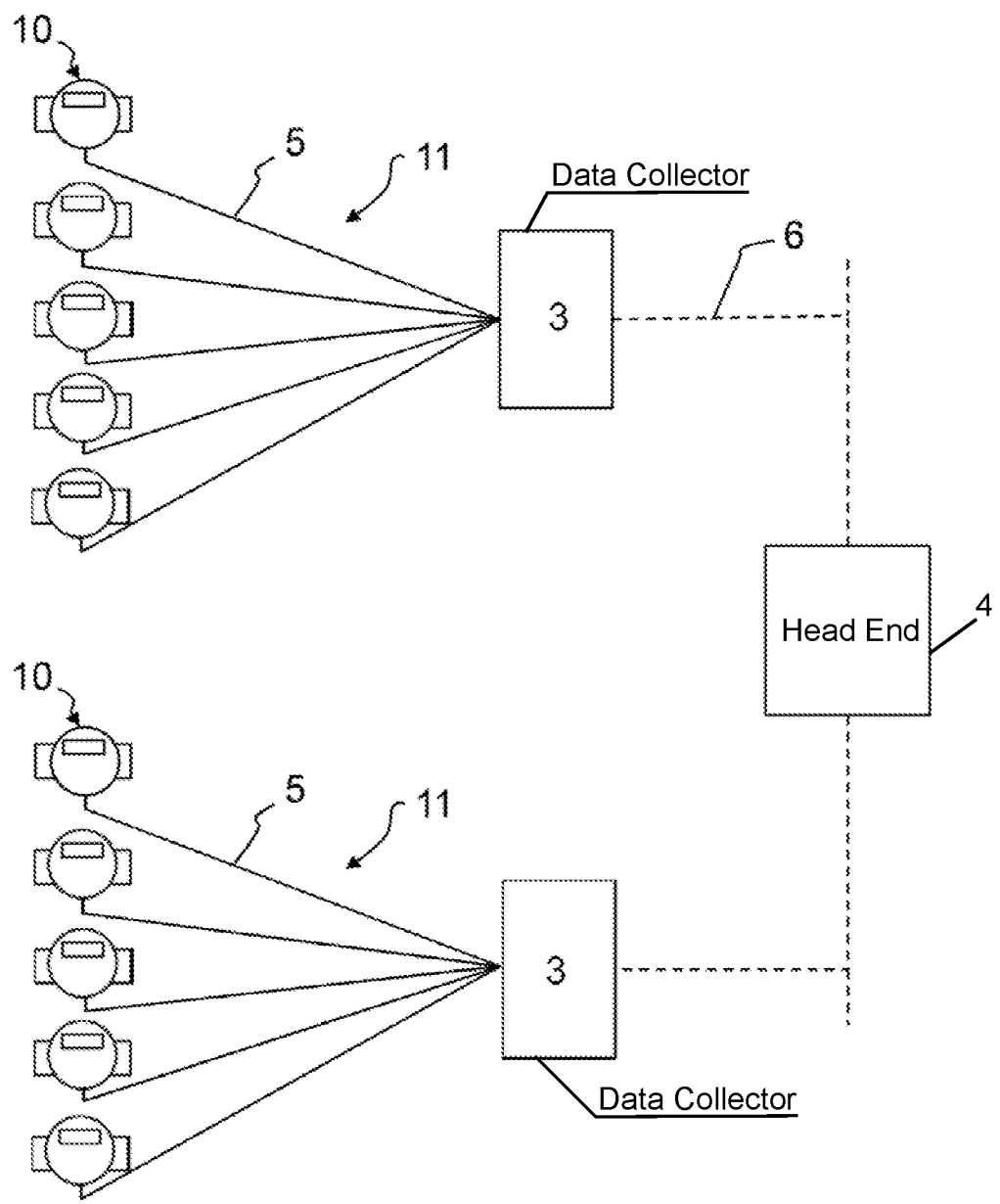
FIG. 1 shows a highly simplified schematic illustration of an example of communication paths of a supply network for collecting and/or forwarding data, which have been recorded by a multiplicity of consumption meters, to a data collector and a head end.

Referring now to the figures of the drawing in detail and first, particularly, to FIG. 1 thereof, there is shown a supply network for distributing consumption media, for example gas, water, electricity, fuel or heat. The supply network comprises a multiplicity of individual local consumption meters 10 which may be assigned to different residential units of an apartment building, for example. The individual consumption meters 10, for example water meters, heat meters, electricity meters or gas meters, are connected to a data collector 3, which can act as the master or concentrator, via a wireless communication path.

Each individual consumption meter 10 may be expediently provided with an associated ID (address), with the result that each individual consumption meter 10 can be directly addressed by the data collector 3 and the data present in the respective consumption meter 10 can be retrieved.

The transmission via the primary communication path 5 is predefined by a bus transmission protocol, for example by the wireless M-bus transmission protocol.

The respective data collector 3 is connected to a so-called head end 4 via a so-called tertiary communication path 6. The data from the entire supply network converge in the head end 4. The tertiary communication path 6 may be a wired communication path or a communication path based on radio technology (for example a mobile radio communication path). Alternatively, the data from the respective data collector 3 can also be read by a portable reading device if necessary and can be read in again at the head end 4. The data can be transmitted in different ways along the tertiary communication path 6, for example via LAN, GPRS, LTE, 3G etc.

The individual consumption meters 10 can be operated using an independent energy supply (rechargeable battery).

As schematically illustrated in FIG. 1, the preferably compressed and formatted time stamps TS of each relevant sensor 1 or consumption meter 10 are transmitted to the data collector 3, which manages a local network of a multiplicity of consumption meters 10 or sensors 1 assigned to it. The preferably compressed and formatted time stamps TS of each of the sensors 1, which are part of the supply network, are transmitted from the data collector 3 to the head end 4.

The data collector 3 can store the time stamps TS retrieved from the respective sensors 1 or consumption meters 10 either over an interval of time (for example one day) and can then forward them to a processing location or to the head end 4. Alternatively, the data can also be immediately forwarded to the head end 4 from the data collector 3.

Figure 2:
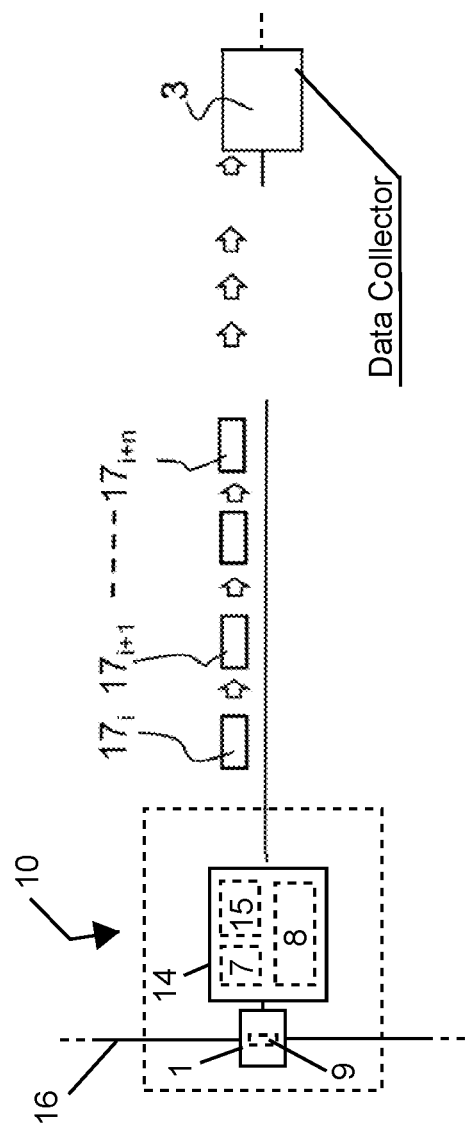
FIG. 2 shows a highly simplified schematic way of illustrating an example of the transmission of time stamps of characteristic raw measurement data to the data collector via the primary communication path from FIG. 1.

According to FIG. 2, the respective consumption meter 10 comprises a sensor 1 equipped with at least one measuring element 9. The sensor 1 is provided for the purpose of generating, via the measuring element 9, raw measurement data which are supplied to a measurement data preparation means 14. The raw measurement data correspond to elementary measuring units of the at least one physical or physico-chemical variable or of the at least one physical or physico-chemical parameter which are provided by the measuring element 9. The raw measurement data may be, for example, raw data in connection with the flow of a medium through a supply line 16, for example a water pipe, in particular the flow rate, the turbidity, the presence of pollutants or the presence of a solid and/or gaseous component or solid and/or gaseous components.

The measured value preparation means 14 of the consumption meter 10 comprises a memory 7, also referred to as storage means 7, a time reference device 15 (crystal) and a microprocessor 8. The above-mentioned components may be provided separately or as an integrated complete component. The consumption meter 10 may comprise its own power supply (not illustrated) in the form of a battery or the like if necessary. The consumption meter 10 can therefore be operated in an autonomous manner in terms of energy.

Prior to the steps illustrated in FIG. 2, a particular value, a particular value change or a particular value difference of the at least one physical or physico-chemical variable or of the at least one physical or physico-chemical parameter is determined within the scope of the correlation model for the assignment of a time stamp TS.

According to the invention, the following steps are carried out at the respective consumption meter 10:

Triggering a time stamp TS if the particular value, the particular value change or the particular value difference is captured by the measuring element 9.

Storing the time stamps TS in the memory 7 of the sensor 1 or of the consumption meter 10.

Transmitting the time stamps TS, preferably in compressed form, via a radio path 11 by preparing time stamp telegrams $17_i, 17_{i+1}, \ldots, 17_{i+n}$ in the measurement data preparation means 14, which telegrams are gradually transmitted to a central processing system, for example a head end 4.

Accordingly, data telegrams $17_i, 17_{i+1}, \ldots, 17_{i+n}$ containing continuous time stamps TS are transmitted in temporal succession. At the receiver end, a continuous gapless raw measurement data stream of very high resolution can be reconstructed from these time stamps TS using the correlation model.

Figure 3:
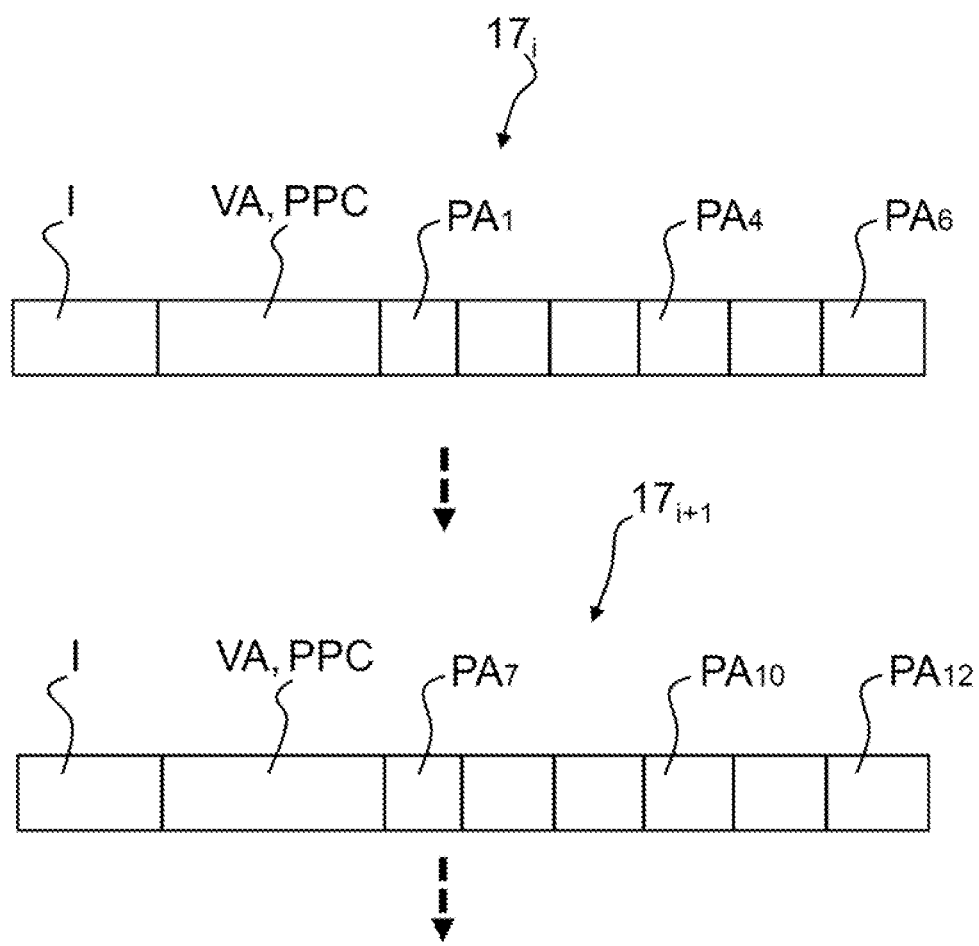
FIG. 3 shows an example of a message structure which is emitted by or retrieved from the measurement data preparation means of the consumption meter according to FIG. 2 via the primary communication path.

As illustrated by way of example in FIG. 3, provision may also be made for the identity (address) I of the relevant sensor 1 and/or the absolute or cumulative value VA of the physical or physico-chemical variable or parameter measured by the relevant sensor 1 to also be transmitted, together with the $PA_j$ packets of the time stamps TS, in the respective data telegram $17_i, 17_{i+1}, \ldots, 17_{i+n}$, wherein the value VA can be provided with a time stamp or can be assigned to one of the elementary time-stamped items of measurement data, for example an index value of a fluid meter. According to one exemplary embodiment, the value VA may be, for example, the meter reading of a water meter at a particular time or the flow rate through the water meter since a previous data transmission (for example the sum Σ of the time stamps $TS_i$ corresponds to the sum Σ of the flow rate; see FIG. 4).

The method may also involve reading and transmitting the value of at least one other physical or physico-chemical parameter PPC of the environment of the relevant sensor 14 of the fluid measured by the latter at a particular time with the $PA_j$ packets of time stamps TS, for example the conductivity of the fluid, the temperature of the fluid, the pH value of the fluid, the pressure of the fluid, and/or a parameter which is characteristic of the quality and/or the composition of the fluid and/or the temperature of the installation environment of the sensor 1.

FIG. 3 shows, by way of example, the individual data telegrams $17_i, 17_{i+1}, \ldots, 17_{i+n}$ according to FIG. 2 in somewhat more detail. The data telegrams $17_i, 17_{i+1}, \ldots, 17_{i+n}$ each comprise, on the one hand, a plurality of data packets $PA_1$-$PA_6$ and $PA_7$-$PA_{12}$, the absolute or cumulative value VA, the identity (address) I of the relevant sensor 1 and the value of at least one other physical or physico-chemical parameter PPC of the environment of the relevant sensor 1 or of the fluid measured by the latter at a particular time, for example the conductivity of the fluid, the temperature of the fluid, the pH value of the fluid, the pressure of the fluid, a parameter which is characteristic of the quality and/or the composition of the fluid and/or the temperature of the installation environment of the sensor 1.

As is also illustrated in FIG. 3 as an example, provision may be made for the compressed time stamps TS to be packaged by formatting the $PA_j$ packets, the size of which must not exceed a predefined maximum value, wherein, each time the accumulated data reach the size of a packet $PA_j$, a new packet or telegram is formed or a new transmission is initiated provided that the predefined interval of time has not previously expired.

According to one preferred variant of the invention, the time stamps TS are compressed before their transmission. The compression of the raw data can be carried out in a loss-free manner.

Alternatively, the compression of the time stamps TS can also be carried out with a predefined permissible loss level. In fact, the compression ratio can then be increased to the detriment of lower temporal accuracy in the reproduction at the receiving end if the user or operator prefers an energy saving and accepts a certain inaccuracy in the recovery and reproduction of the original raw measurement data (that is to say accepts a certain loss). This loss ratio or the compression ratio can be provided as a programmable or adjustable parameter which determines or sets the compression mode.

As clear and non-restrictive examples of data compression algorithms, the following can be taken into account within the scope of the method according to the invention: differential encoding (delta encoding) in conjunction with Huffman coding, runlength encoding (RLE) or preferably adaptive binary arithmetic coding (CABAC).

It is possible for the time stamps TS in the storage means 7 of the consumption meter 10 to be deleted only when the transmission of the time stamps TS has been confirmed by the receiver or data collector 3.

Thanks to the invention, it is possible to have, at the data collector 3 or receiving location (for example head end 4), information which makes it possible to authentically and completely reconstruct all time stamps TS provided by the various sensors 1 in a very high temporal resolution and permits unlimited flexibility in the evaluation of said data. The expansion capability of "business" functions can be easily and centrally taken into account without influencing the method of operation or even the structure of subassemblies (sensors, communication means and the like).

The structure of the sensor 1 can be simpler and its operation can be more reliable in comparison with previously known solutions. Furthermore, the energy consumption of the subassembly comprising the sensor 1 and the communication means 2 is lower than in the current embodiments which locally evaluate the data.

The invention can be applied to the measurement and remote reading of a wide variety of parameters and variables. It suffices to be able to accurately date an elementary change (which can be measured by the sensor 1) in a parameter or a variable in accordance with the resolution of the sensor 1 in question (the time stamp TS can correspond to the resolution of the sensor 1 or possibly to a multiple of this resolution).

If the measured variable or the measured parameter can also change decrementally, the time stamps TS are elementary measuring units provided with signs (positive or negative units).

In connection with an advantageous use of the invention, in connection with the term of consumption, provision may be made for the or one of the measured physical variables to relate to a flow medium, wherein each time stamp TS corresponds to an elementary quantity of fluid which is measured by the sensor 1 depending on its measurement accuracy. The measured fluid may be, for example, gas, water, fuel or a chemical substance.

As an alternative or in addition to the embodiment variant mentioned above, the invention may also provide for the or one of the measured physico-chemical variables to be selected from the group formed by the temperature, the pH value, the conductivity and the pressure of a fluid which flows through the relevant sensor 1 or with which contact is made by the latter.

If at least one parameter is alternatively or additionally measured, this or one of these measured physical or physico-chemical parameters may be characteristic of the quality and/or composition of a fluid which flows through the relevant sensor 1 or comes into contact with the latter, for example turbidity, the presence of pollutants or the presence of a solid and/or gaseous component or solid and/or gaseous components.

It goes without saying that the above-mentioned variables and parameters are only examples which are not restrictive.

Accordingly, data telegrams 17 are continuously formed at a particular time and are gradually transmitted. The sum of the individual data packets $PA_1, \ldots, PA_n$ then forms a continuous time-stamped raw measurement data stream 13.

Figure 4:
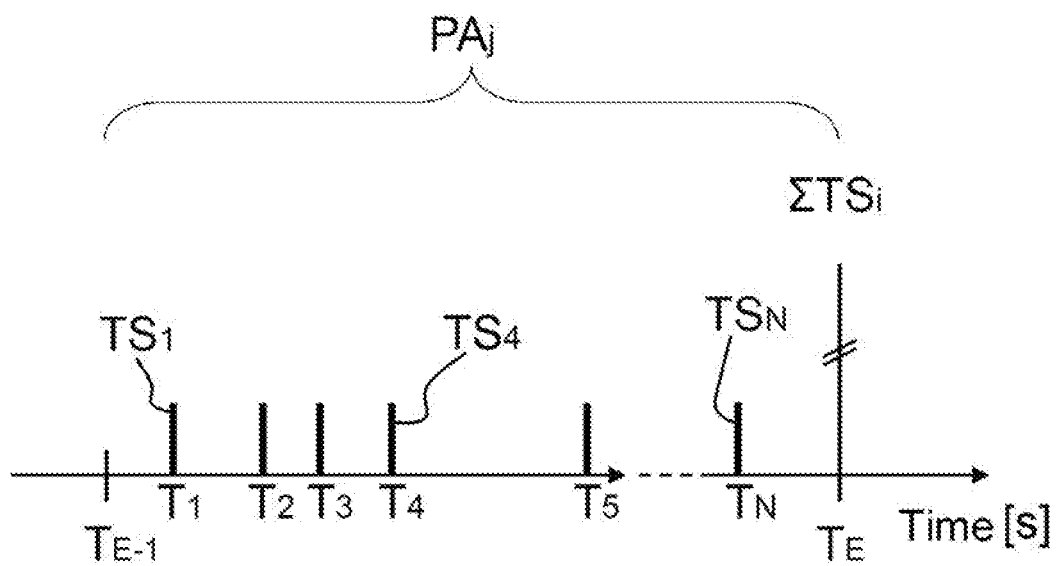
FIG. 4 shows an example of a chronogram of time stamps of the raw measurement data read from a sensor between two uplink transmission operations (messages or telegrams which are emitted at the times TE-1 and TE), in a context of the remote reading of the volume consumption (in this case, the packet $PA_j$ contains N time stamps)

FIG. 4 shows, by way of example, an example of a message structure which is transmitted from the sensor 1 or consumption meter 10 to the data collector 3 or to the head end 4. Each time stamp $TS_1$ to $TS_N$ corresponds in this case, within the scope of the correlation model, to an elementary quantity of fluid which is measured by the sensor 1. The measured fluid may be, for example, gas, water, fuel or a chemical substance. In the interval of time $T_{E-1}$ to $T_E$, N pulses are therefore measured and the time stamps $TS_1$ to $TS_N$ are stored, which, in the case of an amount of one litre for each time stamp TS for example, corresponds to a flow rate of a total of N litres within this interval of time. The measured value preparation means forms a data packet $PA_1$ containing N time stamps $TS_1$ to $TS_N$. Data telegrams $17_i$, $17_{i+1}$ are formed from the plurality of data packets, for example $PA_1$ to $PA_6$ and $PA_7$ to $PA_{12}$, according to FIG. 3.

So that the method according to the invention can be adapted to changes in the development of the parameter or the measurement variable and satisfactory updating of the available instantaneous data is ensured at the same time, the method can advantageously involve, in particular, forming a new packet or telegram 17 or carrying out a new data transmission in the form of a message or a telegram as soon as at least one of the two conditions below has been satisfied:
  (a) a predefined interval of time has expired, and/or
  (b) a predefined quantity of, in particular, compressed collected data or time stamps TS since the previous transmission has been reached.

The use of said condition (b) can involve, for example, regularly checking the size of all new time stamps TS in compressed form after a predefined number of new time stamps TS have been created. If these sizes are close to a critical size, for example close to the size of a packet stipulated by the transmission protocol, a new transmission operation is carried out (condition (b) satisfied before condition (a)) unless the predefined interval of time between two successive transmissions has expired first (condition (a) satisfied before condition (b)).

Figure 5:
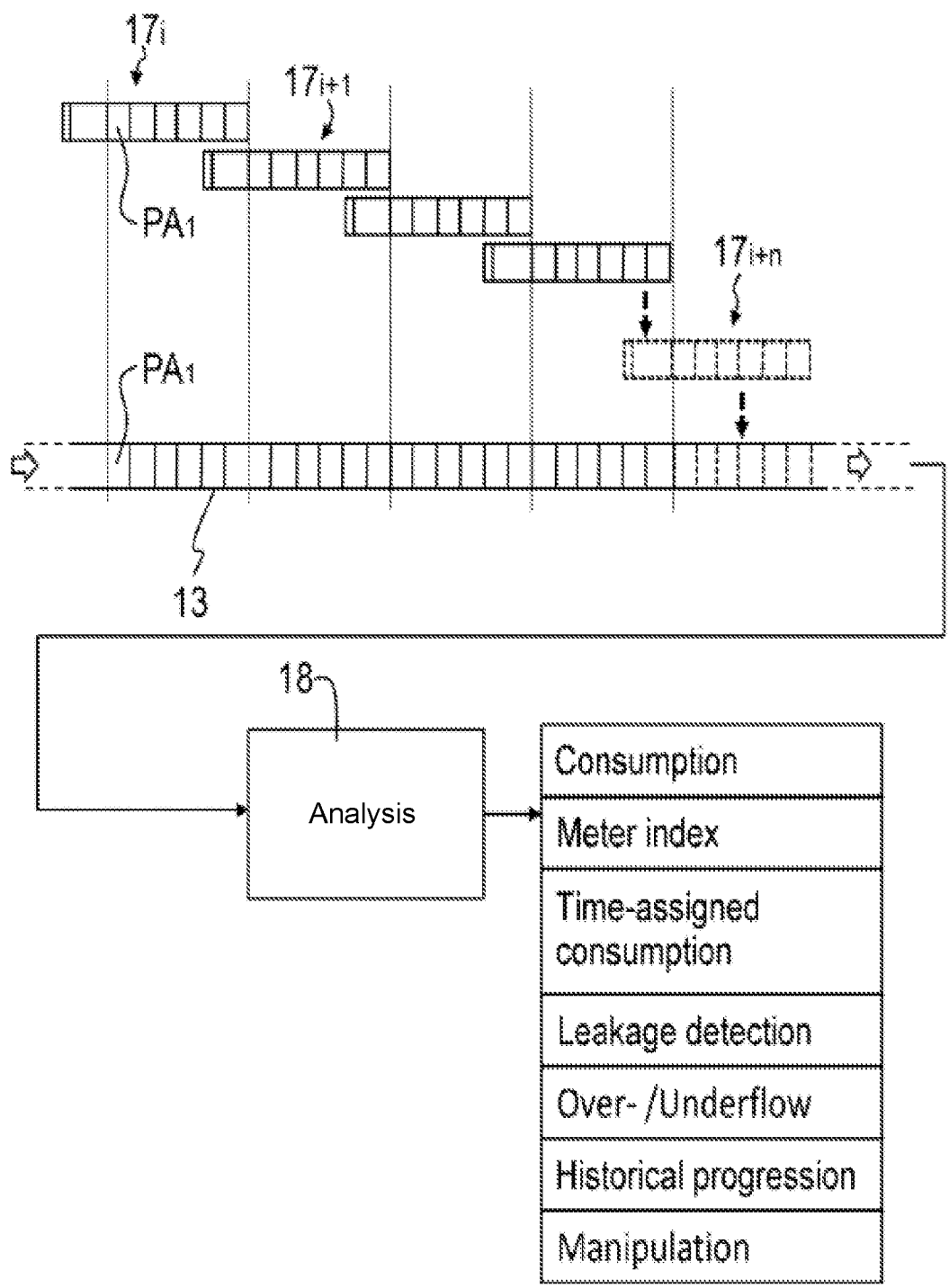
FIG. 5 shows an example of the combination of the data packets or messages or telegrams containing the time stamps and reconstructions to form a time-continuous raw measurement data stream including its evaluation possibilities in a highly simplified schematic manner of illustration.

FIG. 5 shows the further processing of the individual time stamps TS provided in data telegrams $17_i$ to $17_{i+n}$ to form a continuous cohesive assignment, from which a gapless raw measurement data stream 13 can be reconstructed on the basis of the correlation model. In this case, the individual data telegrams $17_i$ to $17_{i+n}$ are combined in such a manner that the respective data or data packets ($PA_j$) or the time stamps TS contained therein are temporally related to those of the adjacent data packets $PA_j$.

Figure 6:
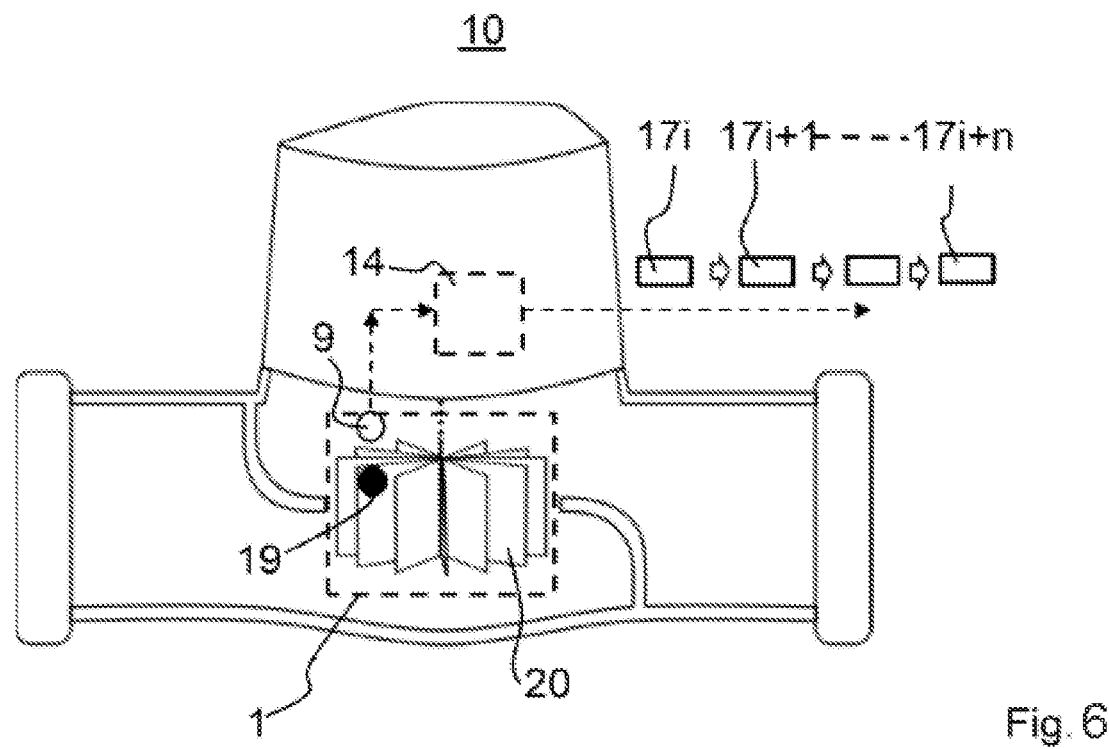
FIG. 6 shows an example of a sensor in a consumption meter in the form of a mechanical flow meter having an impeller, which can be used to generate corresponding time stamps of raw measurement data for the flow.

FIG. 6 illustrates, only by way of example, a mechanical flow meter 10 having a sensor 1 for the flow. The sensor 1 comprises an impeller 20, a measuring element 9 in the form of a Hall sensor, for example, and a pulse generator element 19 which rotates to a greater or lesser extent depending on the flow through the flow meter 10. The rotational movement of the impeller 20 is captured by the measuring element 9 as a voltage value which is excited by the pulse generator element 19 provided that the relevant vane of the impeller 20 is at the position of the measuring element 9. As a result of the correlation model, it is known, during evaluation, what flow volume one revolution corresponds to. One revolution of the impeller 20 may correspond, for example, to one litre of fluid.

Figure 7:
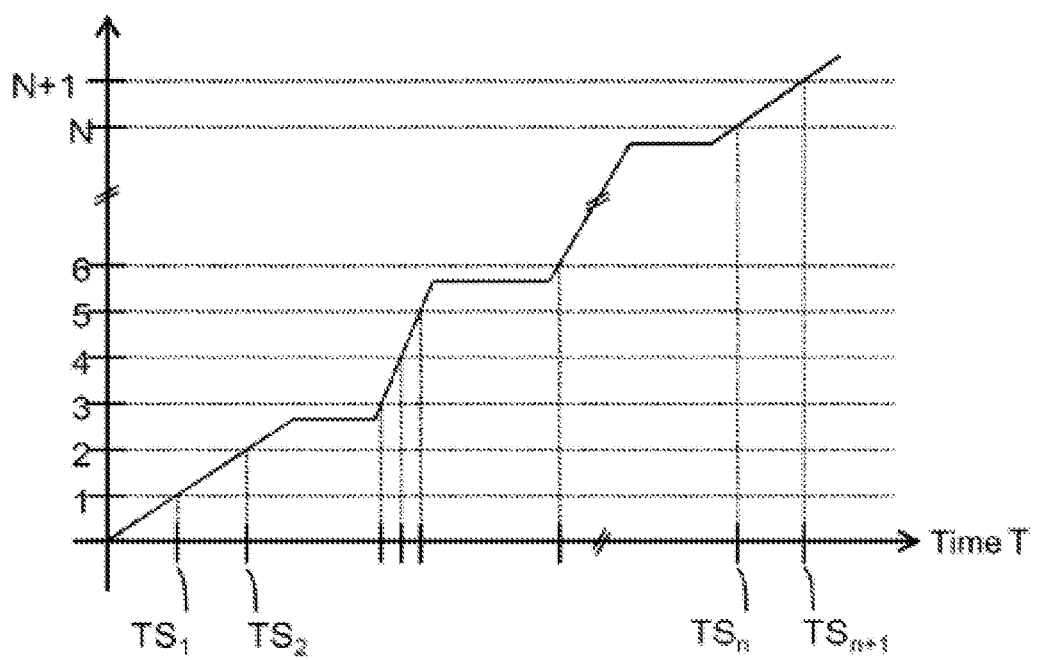
FIG. 7 shows an example of a correlation model for generating time stamps on the basis of the raw measurement data acquired by the sensor according to FIG. 6.

A correlation model is stored in the measured value preparation means 14 and is used to determine in advance the conditions for generating time stamps TS for particular raw measured values. FIG. 7 shows a simplified illustration of an example of such a correlation model, for example for a continuous cumulative flow measurement. In this case, the measuring unit is, for example, a pulse captured by the measuring element 9 of the sensor 1 illustrated in FIG. 6, for example a voltage pulse corresponding to one revolution of the impeller 20. The predefined resolution of the measuring method therefore corresponds in this example to one revolution of the impeller 20. The raw measured values, that is to say the pulses triggered by the revolutions, and the associated times T, are stored in the storage means 7 of the sensor 1. The measured value preparation means 14 generates an associated time stamp $TS_1, TS_2, \ldots$ to $TS_{n+1}$ for each raw measured value (that is to say for each revolution/pulse). The time stamps TS are continuously stored in the storage means 7. If the impeller 20 does not rotate, a pulse is not generated and a time stamp is therefore not provided either. If the impeller 20 rotates more slowly, the time at which the pulse is captured along the time axis T is accordingly later. Accordingly, a later time stamp TS is generated in this case. As is clear from FIG. 7, a multiplicity of time stamps TS are therefore generated and define the flow continuously measured over the relevant period.

The time stamps TS are combined in data packets $PA_j$ and, according to FIG. 2, are gradually transmitted on request by the data collector 3 to the latter as data telegrams $17_i$, $17_{i+1}$, $17_{i+n}$ via the primary communication path 5. The data transmission can preferably be carried out here in compressed form. It is consequently a continuous gapless time stamp data stream of very high resolution which is transmitted along the primary communication path 5 in the form of the individual continuous data telegrams $17_i$, $17_{i+1}, \ldots, 17_{i+n}$.

Figure 8:
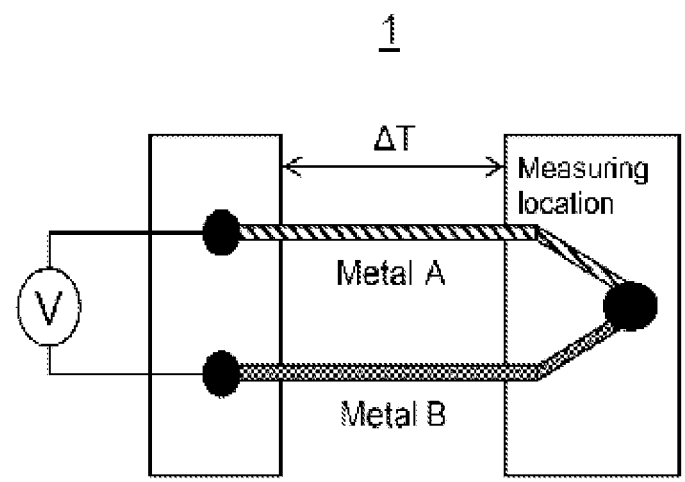
FIG. 8 shows a simplified illustration of an example of a temperature sensor.

The collection of data is not restricted to a flow measurement. FIG. 8 shows, for example, a sensor 1 in the form of a temperature sensor based on a resistance measurement. The temperature sensor comprises two metal conductors (A, B) which are connected to one another in the region of a measuring location and have different thermal conductivity. In the event of a temperature difference $\Delta T$ between the measuring location and the opposite end of the two conductors, a voltage V or a voltage change can be tapped off. In this case, a time stamp TS for a change in the voltage captured by the sensor can be determined as a correlation model.

Figure 9:
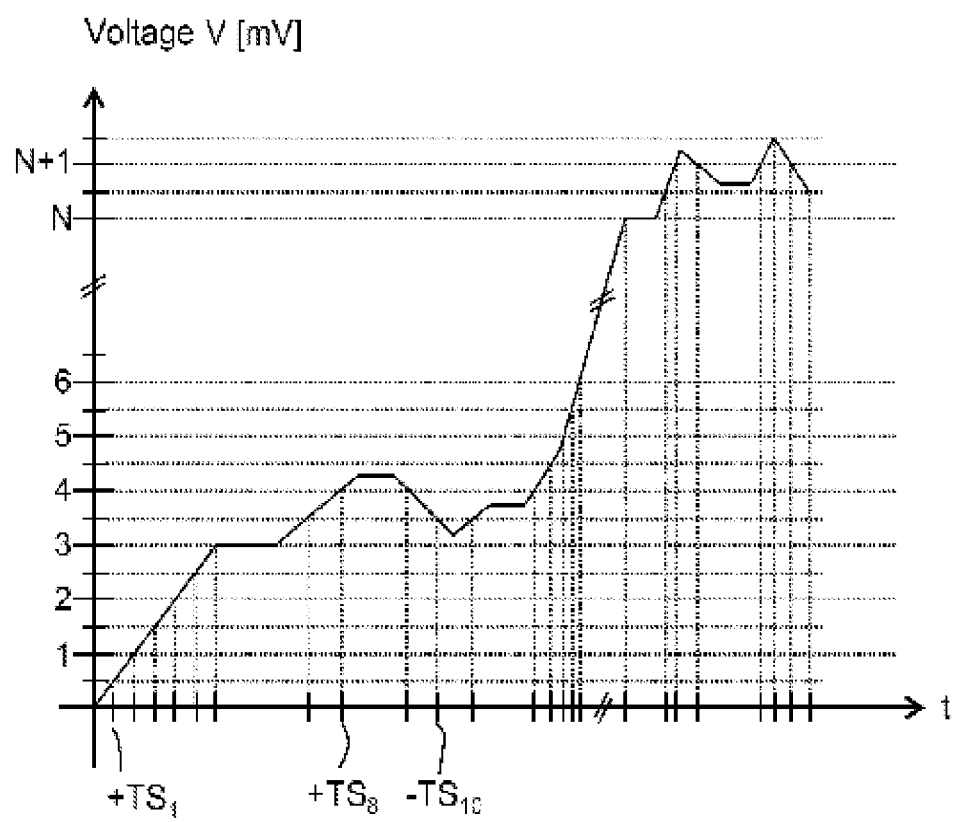
FIG. 9 shows another example of a correlation model for generating time stamps on the basis of the raw measurement data acquired by the sensor according to FIG. 8.

FIG. 9 shows an example of a corresponding raw measurement data curve of voltage values V for generating corresponding time stamps TS in a temperature measurement. Accordingly, an associated time stamp TS is generated for each rise or fall of the voltage, for example by 0.5 mV. The determined resolution of the method is therefore 0.5 mV. Since the curve profile may be rising and falling in the case of a temperature measurement, the time stamps are provided in this case with a sign "+" for rising or "−" for falling. As becomes clear from FIG. 9, a continuous sequence of time stamps TS, which represent the measured voltage profile and therefore the temperature over the period in question in a very accurate and gapless manner, is also obtained here. If the temperature, that is to say the voltage V, does not change, a time stamp is not generated. For the rest, the method corresponds to the measures explained in connection with the initially described example of flow measurement.

Figure 10:
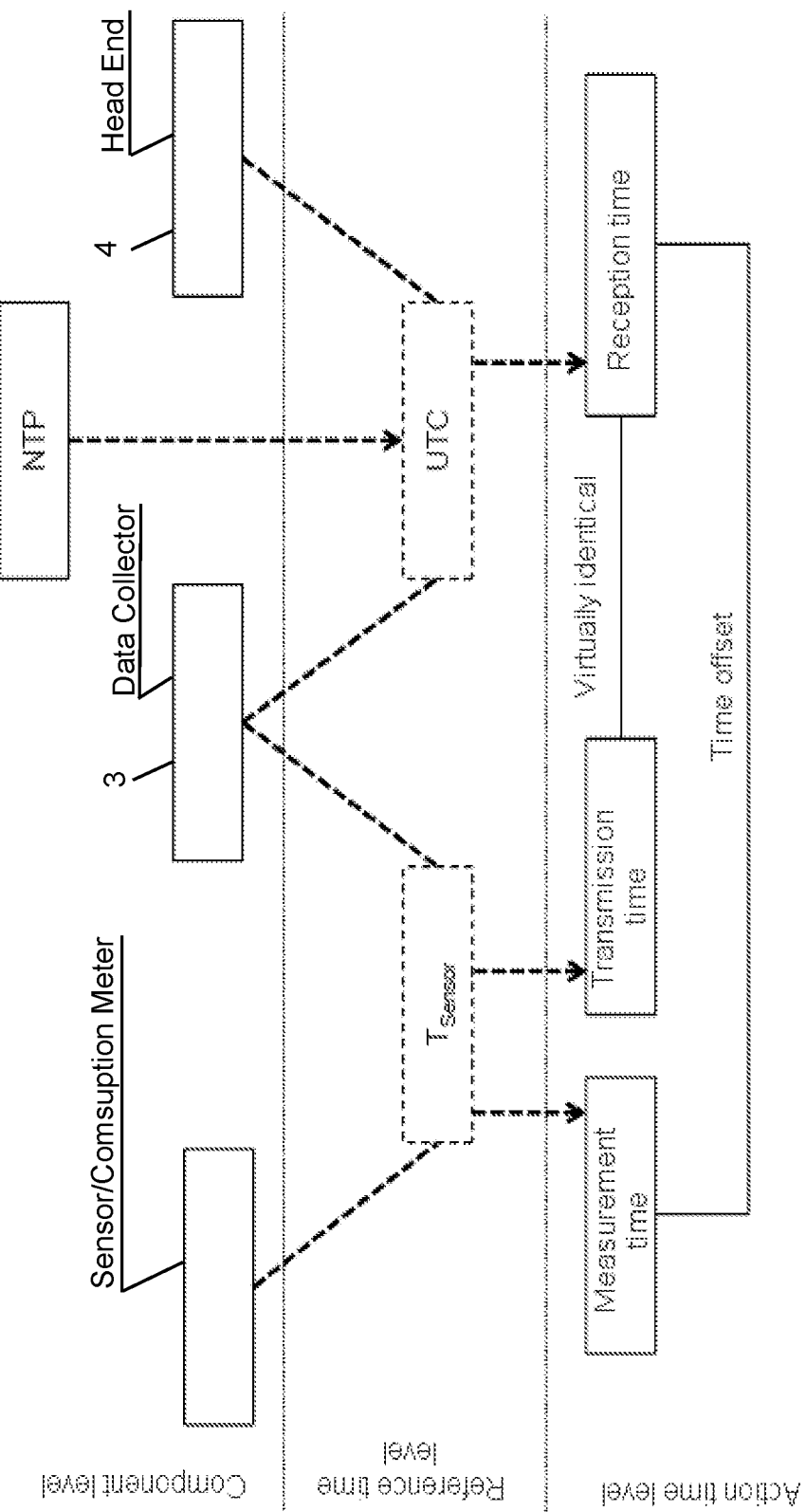
FIG. 10 shows a highly simplified schematic illustration of the network structure with sensor time and standard time.

The sensor network illustrated in FIG. 10 comprises, on the component level, a sensor 1 or a consumption meter 10, a data collector 3 and a head end 4. The sensor 1 and the consumption meter 10 have, on the reference time level, their own sensor time $T_S$ which is determined, for example, via an oscillating crystal in the sensor 1 or in the consumption meter 10. The head end 4 and the data collector 3 are synchronized with a standard time, for example universal time coordinated (UTC). The standard time can be retrieved, for example, from a server using a network time protocol (NTP). If a unidirectional sensor network is involved, there may be a plurality of time zones on account of the missing downlink from the data collector 3 or from the head end 4 to the sensor 1 or to the consumption meter 10 for the purpose of synchronizing the time of the sensor 1 or of the consumption meter 10. It is therefore necessary for the system to coordinate the individual varying times of the sensor 1 or of the consumption meter 10 with universal time and/or to compensate for said times.

The sensor time $T_{Sensor}$ at the measurement time at the sensor 1 or at the consumption meter 10 is used to generate time stamps TS from raw measurement data on the basis of the correlation model. The measurement time therefore usually has a time offset in comparison with the reception time at the data collector 3. For the transmission time of a telegram from the sensor 1 or from the consumption meter 10, it can be assumed that it is identical or virtually identical to the reception time of this telegram at the data collector 3.

Figure 11:
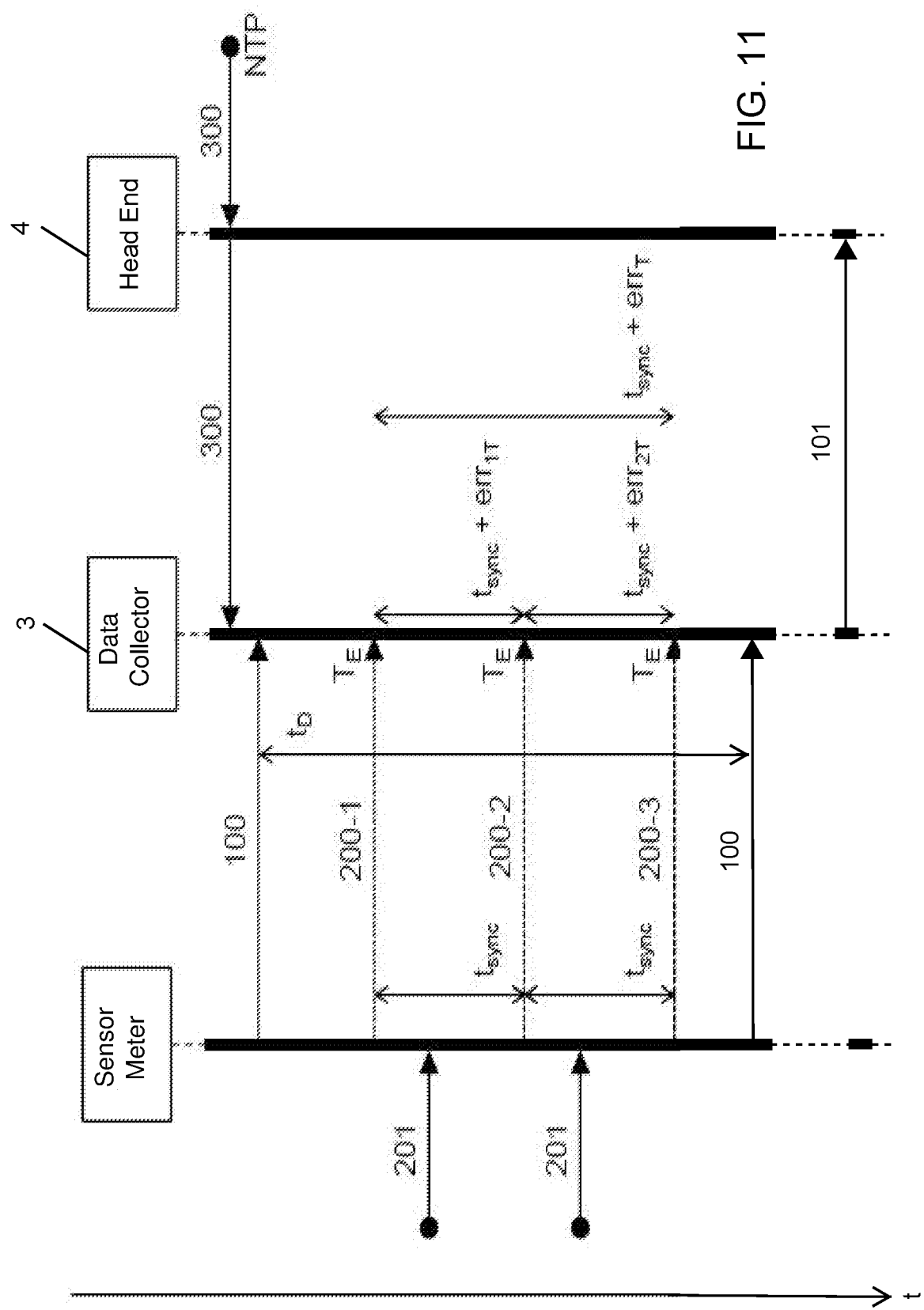
FIG. 11 shows an exemplary simplified schematic sequence for compensating for the temporal offset between the head end, data collector and sensor or consumption meter.

In the configuration of the invention shown in FIG. 11, the compensation for the temporal offset 200 is decoupled from and independent of the actual transmission of the data or of the time stamps 100. The time stamps TS from raw measurement data on the basis of the correlation model, which are recorded by the sensor 1 or consumption meter 10, are transmitted on to the data collector 3 in a bundled manner in the form of time stamp telegrams 100 in a time interval $t_D$. The time intervals in which the sensor 1 and the consumption meter 10 generate the time stamps TS are therefore shorter than the time intervals in which the time stamps TS are transmitted on to the data collector 3. The time stamps TS are buffered, for example, in the storage means 7 of the consumption meter 10 until transmission as a time stamp telegram 100. The time stamps TS are then prepared for transmission from the consumption meter 10 on to the data collector 3 as time stamp telegrams 100. The time stamp telegrams 100 contain the time stamps TS which are represented by arrays of times, for example. The time stamp telegrams 100 may additionally transmit the transmission time based on the sensor time $T_{Sensor}$. A time stamp telegram 100 can therefore be or contain a data telegram 17 or a data packet $PA_j$. In this case, the time stamps of the sensor 1 or of the consumption meter 10 do not correspond to a standard time. The sensor 1 and the consumption meter 10 transmit the time stamp telegrams 100 according to a predefined transmission interval. These transmission intervals are usually asynchronous with respect to the timer in the data collector 3 or the head end 4, as a result of which a correct time correlation between the current sensor time $T_{Sensor}$ and the standard time UTC is not directly possible. In order to establish a time correlation between the sensor 1 or the consumption meter 10 and the data collector 3 or the head end 4, the sensor 1 or the consumption meter 10 additionally transmits synchronous and possibly numbered compensation telegrams 200. These compensation telegrams 200 have a periodicity which is known in the system.

The sensor 1 and the consumption meter 10 use time-discrete values 201 to create the compensation telegrams 200. These time-discrete values 201 may be derived from an oscillating crystal, for example.

The data collector 3 receives the time stamp telegrams 100 and the compensation telegrams 200. The data collector 3 precisely measures the reception time $T_E$ of the compensation telegrams 200. Three compensation telegrams 200-1 to 200-3 are illustrated, by way of example, in FIG. 11. The data collector 3 calculates the time offset and/or the temporal drift $err_T$ by means of the interval between the compensation telegrams 200. The interval $t_{sync}$ between the compensation telegrams 200 must be short enough for this purpose. This justifies the assumption that no significant temporal drift occurs between two or more compensation telegrams 200. In FIG. 11, the compensation telegrams 200-1 to 200-3 are emitted by the sensor 1 or by the consumption meter 10 with a temporal interval of $t_{sync}$. The data collector 3 determines the temporal interval between the received compensation telegrams 200-1 to 200-3 by means of the reception times $T_E$. If the time intervals between the reception times $T_E$ do not correspond to the time interval $t_{sync}$, an error $err_{1T}$ or $err_{2T}$ is determined. Numbering the compensation telegrams 200 makes it possible to determine the time offset and/or the temporal drift $err_T$, for example by averaging the error $err_{1T}$ to $err_{100T}$ of a hundred compensation telegrams 200.

The data collector 3 prepares the received time stamp telegrams 100, which contain, for example, arrays containing time stamps TS on the basis of the sensor time $T_{sensor}$, together with the time offset and/or temporal drift $err_T$ determined for the sensor 1 or consumption meter 10, as a time stamp packet 101 for uploading to the head end 4. The time stamp packets 101 are uploaded according to a previously stipulated time interval. The time offset and/or the temporal drift $err_T$ can also be calculated in the head end 4, for example, in addition to the data collector 3. In this case, the time stamp packets 101 also contain, for each sensor 1 or consumption meter 10, individual arrays containing the reception times $T_E$, from which the time offset and/or the temporal drift $err_T$ can be calculated. A temporal drift applies to an array of time stamps TS, whereas an offset applies to the individual time stamp. The temporal drift can also be compensated for with knowledge of the offset.

The head end 4 receives time stamp packets 101 from a multiplicity of data collectors 3. The head end 4 monitors the current time offset and/or the current temporal drift of all sensors 1 or consumption meters 10 under the management of the head end 4. As soon as the head end 4 receives an update for the time offset and/or the temporal drift of a sensor 1 or consumption meter 10, the head end 4 coordinates the received new value with the current value and carries out a validation. The head end 4 reorganizes the arrays of time stamps TS according to the time offset and/or temporal drift individually validated for the sensor 1 or consumption meter 10 and persistently keeps the data available or keeps the data available over a relatively long period.

Figure 12:
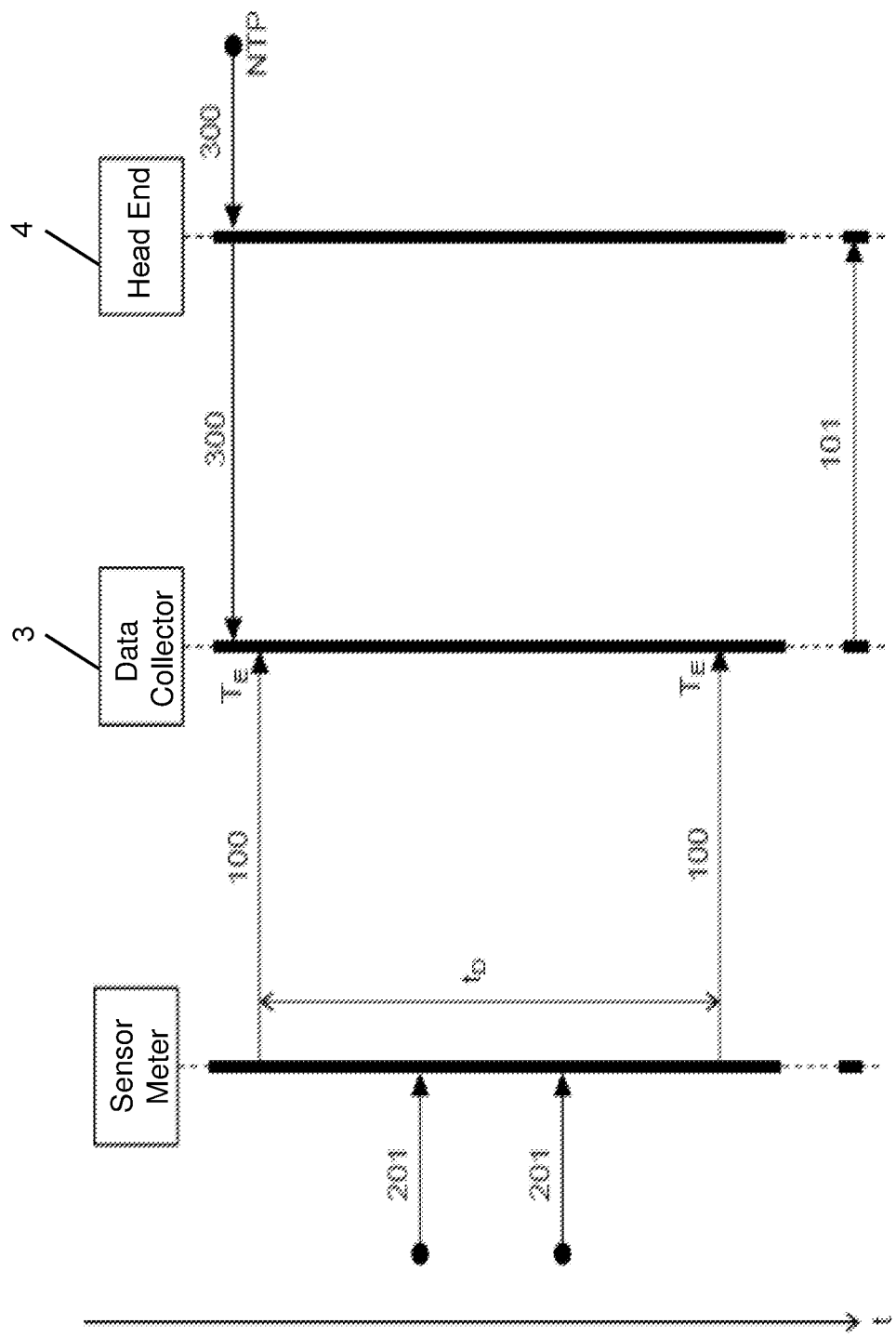
FIG. 12 shows an alternative exemplary simplified schematic sequence for compensating for the temporal offset between the head end, data collector and sensor or consumption meter.

In the configuration illustrated in FIG. 12, the time compensation is integrated in the regular transmission of the time stamps TS or in the time stamp telegrams 100. As a result, there is close coupling between the time stamps TS and the measurement time within the data units. If time stamps TS are interchanged or transmitted within the system, it is possible to access both items of information for each unit for data processing. On the other hand, it is necessary for the sensor 1 or the consumption meter 10 to adapt the transmission of the time stamps TS. For this purpose, the transmission time on the basis of the sensor time $T_{Sensor}$ can be transmitted within the corresponding time stamp telegram 100. The data collector 3 records the reception time $T_E$ for each received time stamp telegram 100 based on the real time, such as UTC.

A datagram comprising time stamps TS contains a plurality of time stamps TS and additionally the exact transmission time. Assuming that the reception time $T_E$ at the data collector 3 and the transmission time at the sensor 1 or consumption meter 10 are identical, the data collector 3 is able to calculate the time offset and/or the temporal drift between its own standard time UTC and the sensor time $T_{Sensor}$. It must be assumed that no significant temporal offset occurs between transmission and reception.

For this purpose, it is necessary, for example, for the time stamp telegram 100 to be provided with the transmission time of the consumption meter 10 in the sensor 1 or in the consumption meter 10, which transmission time is derived from the timer in the consumption meter 10, for example. Upon receiving this time stamp telegram 100, in the data collector 3, the concomitantly transmitted transmission time of the consumption meter 10 can be compared with the reception time in the data collector 3. If there is no time offset and/or temporal drift $err_T$ between the consumption meter 10 and the data collector 3, the transmission time transmitted by the consumption meter 10 would correspond to the reception time in the data collector 3 under the above-described assumption that the transmission time of the time stamp telegram 100 is identical to the reception time of this time stamp telegram 100. If the transmission time and reception time are not identical, a time offset and/or a temporal drift $err_T$ between the timer in the consumption meter 10 and the timer in the data collector 3 can be calculated therefrom. If the time offset of the sensor time $T_{Sensor}$ with respect to the real time is known, relative time stamps TS can be corrected in a telegram-specific manner.

In the configurations illustrated in FIG. 11 and FIG. 12, it is irrelevant to the applicability of the method whether the time offset and/or the temporal drift $err_T$ is/are corrected in the data collector 3 or in the head end 4. Since the head end 4 and the data collector 3 are coordinated with the same standard time, for example with universal time coordinated UTC, the data collector 3 and the head end 4 are therefore able to correct the time offset and/or the temporal drift.

As a result of the inventive collection of time stamps TS which are provided by the sensors 1 or consumption meters 10 of the or a particular network, the invention enables all types of evaluation, analysis, checking, monitoring and generally useful or desired processing and utilization since the fundamental individual raw information is available. The evaluation of the provided time stamps TS is preferably carried out in the region of the head end 4 using evaluation means 18 and reveals a multiplicity of items of important information which are needed to manage the supply network but were previously not able to be generated, for example consumption, meter index, time-assigned consumption, leakage detection, over/underflow, historical progression and/or manipulation. Information can therefore also be retrospectively retrieved without a time gap at any time and can be supplied to a previous evaluation.

The raw measurement data reconstructed from the time stamps TS are present in the head end 4, according to the invention, in a very high resolution or granularity without time gaps as a raw measurement data stream 13. Consequently, in contrast to previous methods, very much more usable data than before are available in the head end 4 on account of the method according to the invention.

The raw measurement data stream 13 present in the head end 4 preferably has a resolution in the seconds range, tenths of a second range, hundredths of a second range or thousandths of a second range.

As schematically illustrated in FIG. 1, the invention also relates to a supply network for distributing a consumable, in particular a fluid consumable, using consumption meters 10 which have been accordingly set up and are operated in the supply network. The respective consumption meter 10 comprises, cf. FIG. 2, at least one sensor 1 which can acquire raw measurement data via a measuring element 9. Furthermore, the respective consumption meter 10 comprises a measurement data preparation means 14 which comprises a microprocessor 8, storage means 7 and a time reference device 15.

In the measurement data preparation means 14, a time stamp TS is effected on the basis of the raw measurement data, the time stamps TS are compressed and preparation is effected into a format which is suitable for transmission via a radio path 11 or via the primary communication path 5 according to a particular protocol.

The consumption meter 10 may comprise its own power supply (not illustrated) in the form of a battery or the like if necessary. The consumption meter 10 can therefore be operated in an autonomous manner in terms of energy.

Evaluation means 18 are provided in the region of the head end 4 and are able to combine the time stamps TS in the individual data telegrams $17_j$-$17_{i+n}$ or their data packets $PA_j$ in a time-continuous manner and without gaps to form a continuous gapless raw measurement data stream 13 and to carry out corresponding decompressions, evaluations, calculations and the like therefrom. The corresponding data preferably comprise all consumption meters 10 in the supply network.

In addition, the above-mentioned system comprises, for the relevant or each geographical area in which the consumption meters 10 are installed, a fixed data collector 3 (concentrator) which, with the consumption meters 10 in the area allocated to it, forms a primary communication path 5 of the supply network. The primary communication path 5 may be in the form of a radio path 11, for example. The data collector 3 is in turn connected to the head end 4 via a tertiary communication path 6. The data can be transmitted in different ways along the tertiary communication path 6, for example via LAN, GPRS, LTE, 3G, 4G etc.

The storage means 7 of each sensor 1 or consumption meter 10 preferably form a buffer memory and are suitable and set up to store the content of a plurality of $PA_j$ packets of time stamps TS, in particular in the compressed state, wherein the content or a part of the content of this buffer memory is transmitted during each transmission or retrieval by the data collector 3.

The information collected by each data collector 3 is directly or indirectly transmitted to the head end 4. The "business" functions are also defined and carried out there.

With the method according to the invention, any desired raw measurement data can therefore be sampled and used as triggers for time stamps TS. The time stamps TS may be, in particular, times or time differences. A starting time is preferably defined.

The time stamps TS in the storage means 7 of the consumption meter 10 are preferably deleted only when the transmission of the time stamps TS via the primary communication path 5 has been confirmed by the receiver or data collector 3.

It goes without saying that a person skilled in the art understands that the invention can be applied to the measurement and remote reading of a wide variety of parameters and variables: it suffices to be able to accurately date an elementary change (which can be measured by the sensor 1) in a parameter or variable in accordance with the resolution of the sensor 1 in question (the time-stamped elementary variation can correspond to the resolution of the sensor or possibly a multiple of this resolution).

It goes without saying that the invention is not restricted to the embodiments described and illustrated in the accompanying drawings. Changes remain possible, in particular with respect to the provision of the various elements or by means of technical equivalents, without departing from the scope of protection of the invention. The subject matter of the disclosure also expressly includes combinations of partial features or subgroups of features.

The following is a list of reference numerals and symbols used in the description and illustration of the invention:
1 Sensor
2 Radio communication means
3 Data collector
4 Head end
5 Primary communication path
6 Tertiary communication path
7 Storage means
8 Microprocessor
9 Measuring element
10 Consumption meter
11 Radio path
13 Raw measurement data stream
14 Measurement data preparation means
15 Time reference device
16 Supply line
17 Data telegram
18 Evaluation means
19 Pulse generator element
20 Impeller
22/23 Ultrasonic transducer element
24 Ultrasonic measurement path
100 Time stamp telegram
101 Time stramp packet
200 Compensation telegram
201 Time-discrete value
300 sync NTP
W Pulse width
$T_{sensor}$ Sensor time
$T_E$ Reception time
$err_T$ Time offset/temporal drift
$PA_j$ Data packet
TS Time stamp

The invention claimed is:

1. A method for collecting data during operation of a local sensor in a supply network for distributing a consumable, the method comprising:
   providing the sensor with a measuring element, with radio communication capability and a memory;
   providing elementary measuring units with the measuring element of the sensor, the elementary measuring units corresponding to at least one physical or physico-chemical variable or at least one physical or physico-chemical parameter and forming raw measurement data;
   determining conditions for generating time stamps in advance using a correlation model in order to determine a measurement resolution of the sensor;
   generating time stamps of successive raw measurement data in the sensor on a basis of the correlation model;
   transmitting only the time stamps of the successive raw measurement data via a wired connection and/or wirelessly, with a result that raw measurement data acquired by the measuring element are reconstructed after transmission of the time stamps of the successive raw measurement data and evaluated on a basis of the time stamps of the successive raw measurement data using the correlation model; and
   correcting a temporal offset between the sensor and a receiver by transmitting telegrams to compensate for the temporal offset.

2. The method according to claim 1, which comprises:
   connecting the sensor to a data collector via a primary communication path;
   providing a tertiary communication path between the data collector and a head end; and collecting time stamps transmitted by the sensor and/or by a consumption meter, storing and evaluating the time stamps transmitted by the sensor and/or by the consumption meter in the data collector and/or in the head end.

3. The method according to claim 2, which comprises transmitting a plurality of time stamps as a data packet along the primary communication path.

4. The method according to claim 1, which comprises:
determining a particular value, a particular value change or a particular value difference of the at least one physical or physico-chemical variable or the at least one physical or physico-chemical parameter, within a scope of the correlation model for an assignment of a time stamp; and
when the particular value, the particular value change or the particular value difference is captured by the measuring element, triggering a time stamp and storing the triggered time stamp in the memory of the sensor.

5. The method according to claim 1, which comprises representing a gradually or incrementally increasing meter reading and/or a value table by way of the time stamps of the successive raw measurement data within a scope of the correlation model.

6. The method according to claim 1, which comprises providing the time stamps of the successive raw measurement data with a sign.

7. The method according to claim 1, which comprises generating a raw measurement data stream on a basis of time stamps arriving at a data collector and/or at a head end using the correlation model.

8. The method according to claim 1, which comprises providing a unidirectional wired connection and/or a radio connection from the sensor to the receiver.

9. The method according to claim 1, which comprises consecutively numbering the telegrams for compensating for the temporal offset.

10. The method according to claim 1, which comprises calculating an error value by means of a reception time of the telegrams for compensating for the temporal offset.

11. The method according to claim 1, wherein a periodicity of the telegrams for compensating for the temporal offset is known and an error value is calculated on the basis thereof.

12. The method according to claim 1, wherein a data collector and/or a head end receives the telegrams for compensating for the temporal offset and determines a temporal error on a basis of a temporal interval between the telegrams for compensating for the temporal offset.

13. The method according to claim 1, which comprises transmitting data telegrams by the sensor in an asynchronous manner with respect to the telegrams for compensating for the temporal offset.

14. The method according to claim 1, wherein a temporal transmission interval of the telegrams for compensating for the temporal offset differs from a temporal transmission interval of the time stamps of the successive raw measurement data.

15. The method according to claim 1, which comprises transmitting the time stamps of the successive raw measurement data from a data collector to a head end together with the telegrams for compensating for the temporal offset.

16. The method according to claim 15, wherein the data collector and/or the head end coordinates telegrams for compensating for temporal offset from a multiplicity of sensors and organizes the telegrams for compensating for the temporal offset from the multiplicity of sensors according to individual temporal error values.

17. The method according to claim 1, which comprises transmitting the time stamps of the successive raw measurement data by the sensor together with the telegrams for compensating for the temporal offset.

18. The method according to claim 1, which comprises determining a temporal error between the sensor and a standard time based on a difference between a transmission time of a telegram in the sensor and a reception time of said telegram in the sensor.

19. The method according to claim 1, which comprises evaluating a raw measurement data stream in a further course of data processing, on a time-historical basis without a time gap irrespective of the measurement resolution of the sensor.

20. The method according to claim 1, wherein the elementary measuring units are an electrical voltage or a current intensity.

21. The method according to claim 1, wherein the physical variable relates to a supply medium selected from a group consisting of water, electricity, fuel, an gas, of a supply network.

22. The method according to claim 1, wherein a measured physical or chemico-physical parameter is characteristic of a quantity, quality and/or composition of a fluid which flows through a relevant sensor or with which contact is made by the relevant sensor.

23. The method according to claim 1, which comprises generating a time stamp with an elementary measuring unit of said elementary measuring units as soon as the elementary measuring unit of said elementary measuring units receives a pulse.

24. The method according to claim 1, wherein a raw measurement data stream of the raw measurement data has a temporal resolution which is determined or conditioned by a sensor sampling rate or a measuring element sampling rate or a multiple thereof.

25. The method according to claim 1, wherein a stream of the raw measurement data is continuous and/or complete, taking a continuous temporal resolution as a basis.

26. The method according to claim 1, which comprises carrying out a new data transmission in a form of a message or a telegram upon satisfaction of at least one of:
(a) expiry of a predefined interval of time; and
(b) reaching a predefined quantity of compressed collected data since a previous transmission has been satisfied.

27. The method according to claim 1, which comprises packaging the time stamps of the successive raw measurement data by formatting them in data packets of a predetermined fixed size, and, each time accumulated data reach a size of a data packet or a predefined interval of time has expired, initiating a new transmission.

28. The method according to claim 1, which comprises carrying out data transmission with redundancy.

29. The method according to claim 28, which comprises effecting the redundancy in the transmission by repeatedly transmitting one or more same time stamps and/or repeatedly transmitting a same data packet in a plurality of successive transmission operations.

30. The method according to claim 1, which comprises transmitting the time stamps of the successive raw measurement data in compressed form.

31. The method according to claim 30, which comprises compressing the time stamps of the successive raw measurement data and with a loss-free compression of the time stamps of the successive raw measurement data.

32. The method according to claim 30, which comprises compressing the time stamps of the successive raw measurement data with a predefined permissible loss level.

33. The method according to claim 1, which comprises collecting data in connection with a consumption, a physical or physico-chemical parameter and/or an operating state, during operation of a plurality of local sensors for consumption meters as part of a supply network which includes the plurality of local sensors.

34. A sensor, configured for operation in accordance with the method according to claim 1.

35. A data collector in communication with a sensor configured for operation in accordance with the method according to claim 1.

36. A supply network for distributing a consumption medium, the supply network comprising:
at least one local sensor for generating and/or forwarding time stamps of raw measurement data based on a correlation model, said at least one local sensor being configured to be operated in accordance with the method according to claim 1;
a data collector;
a primary communication path between said at least one local sensor and said data collector;
a head end for evaluating the raw measurement data from said at least one local sensor; and
a tertiary communication path between said data collector and said head end.

37. The supply network according to claim 36, wherein:
said at least one local sensor is one of a plurality of local sensors; and
the raw measurement data from said at least one local sensor relate to a consumption of the consumption medium, a physical or physico-chemical parameter, and/or an operating state of a consumption meter.

* * * * *